United States Patent
He et al.

(10) Patent No.: US 11,877,049 B2
(45) Date of Patent: Jan. 16, 2024

(54) VIEWING ANGLE ADJUSTMENT METHOD AND DEVICE, STORAGE MEDIUM, AND ELECTRONIC DEVICE

(71) Applicant: Tencent Technology (Shenzhen) Company Limited, Shenzhen (CN)

(72) Inventors: Ning He, Shenzhen (CN); Yiqing Yang, Shenzhen (CN); Yang Deng, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 16/894,046

(22) Filed: Jun. 5, 2020

(65) Prior Publication Data

US 2020/0304706 A1 Sep. 24, 2020

Related U.S. Application Data

(63) Continuation-in-part of application No. PCT/CN2018/123990, filed on Dec. 26, 2018.

(30) Foreign Application Priority Data

Jan. 19, 2018 (CN) .......................... 201810054939.4

(51) Int. Cl.
*H04N 21/472* (2011.01)
*H04N 23/62* (2023.01)

(52) U.S. Cl.
CPC ........... *H04N 23/62* (2023.01); *H04N 21/472* (2013.01)

(58) Field of Classification Search
None
See application file for complete search history.

(56) References Cited

U.S. PATENT DOCUMENTS

| 2009/0011808 A1* | 1/2009 | Ikematsu | A63F 13/837 463/2 |
| 2011/0141141 A1* | 6/2011 | Kankainen | G06T 3/4038 345/632 |

(Continued)

FOREIGN PATENT DOCUMENTS

| CN | 101257532 A | 9/2008 |
| CN | 102081493 A | 6/2011 |

(Continued)

OTHER PUBLICATIONS

Office Action with English Translation of Concise Explanation of Relevance for Chinese Patent Application No. 201810054939.4 dated May 17, 2021; 7 pages.

(Continued)

*Primary Examiner* — Rinna Yi
(74) *Attorney, Agent, or Firm* — Crowell & Moring LLP

(57) ABSTRACT

This application discloses a viewing angle adjustment method and device, a storage medium, and an electronic device. The method may include: detecting, by a terminal by using a sensor in the terminal, that the terminal changes from a first position to a second position, the terminal displaying a first image in a virtual scene at a first viewing angle when the terminal is located at the first position, and the first image displaying an object targeting identifier; determining a second viewing angle according to the first position, the second position, the first viewing angle, a second variation quantity from the first viewing angle to the second viewing angle corresponding to a first variation quantity from the first position to the second position; and displaying, by the terminal, a second image in the virtual scene at the second viewing angle when the terminal is located at the second position, the second image also displaying the object targeting identifier.

11 Claims, 9 Drawing Sheets

(56) References Cited

U.S. PATENT DOCUMENTS

| | | | |
|---|---|---|---|
| 2011/0227913 A1 | 9/2011 | Hyndman | |
| 2011/0300931 A1* | 12/2011 | Kitahara | A63F 13/655 |
| | | | 463/30 |
| 2012/0105436 A1* | 5/2012 | Averbuch | G06T 19/00 |
| | | | 345/419 |
| 2013/0322843 A1 | 12/2013 | Suzuki et al. | |
| 2014/0040784 A1* | 2/2014 | Behforooz | H04L 12/1822 |
| | | | 715/758 |
| 2014/0125594 A1* | 5/2014 | Lee | G06F 3/011 |
| | | | 345/158 |
| 2014/0274239 A1 | 9/2014 | Han | |
| 2014/0300569 A1* | 10/2014 | Matsuki | G09G 3/20 |
| | | | 345/173 |
| 2015/0112749 A1* | 4/2015 | Erdal | G06Q 10/1095 |
| | | | 715/752 |
| 2017/0054913 A1* | 2/2017 | Hara | H04N 5/23296 |
| 2017/0131763 A1* | 5/2017 | Sakuta | G06F 3/0488 |
| 2018/0104591 A1* | 4/2018 | Fukuda | G06F 3/0488 |

FOREIGN PATENT DOCUMENTS

| | | |
|---|---|---|
| CN | 103327256 A | 9/2013 |
| CN | 104436657 A | 3/2015 |
| CN | 105148520 A | 12/2015 |
| CN | 106528020 A | 3/2017 |
| CN | 107450747 A | 12/2017 |
| CN | 107479804 A | 12/2017 |
| CN | 108211342 A | 6/2018 |
| EP | 2 441 504 A2 | 4/2012 |
| EP | 2 441 504 A3 | 7/2013 |
| EP | 2415505 A3 | 8/2017 |
| JP | 2003-19348 A | 1/2003 |
| JP | 2013-258614 A | 12/2013 |

OTHER PUBLICATIONS

International Search Report and Written Opinion with English Translation for International Patent Application No. PCT/CN2018/123990 dated Mar. 28, 2019; 13 pages.

Office Action for Chinese Patent Application No. CN201810054939.4 dated Aug. 3, 2020; 12 pages.

Https://v.youku.com/v_show/id_XNTA3ODgzNzUy.html; Author: I want to get married; Title: Five elements ifiveMX4G game test with gyro control; Jan. 28, 2013.

Http://www.cnmo.com/guide/134449.html Author: Xu, Lei; Title: Quad-processor is not useful, an inside look at mobile phone internal sensors; Feb. 16, 2012.

Https://www.cr173.com/gonglue/198737_1.html Author: XiXi; Title: Wilderness Operation—how to adjust sensitivity, a detailed sensitivity setting guide; Nov. 1, 2017.

Office Action with English Translation of Notice of Reasons for Refusal for Japanese Patent Application No. 2020-539271 dated Aug. 18, 2021; 15 pages.

Extended European Search Report for European Patent Application No. 18900885.7 dated Sep. 14, 2021; 28 pages.

Office Action for European Patent Application No. 18900885.7-1208 dated Jan. 3, 2023, 7 pages.

* cited by examiner

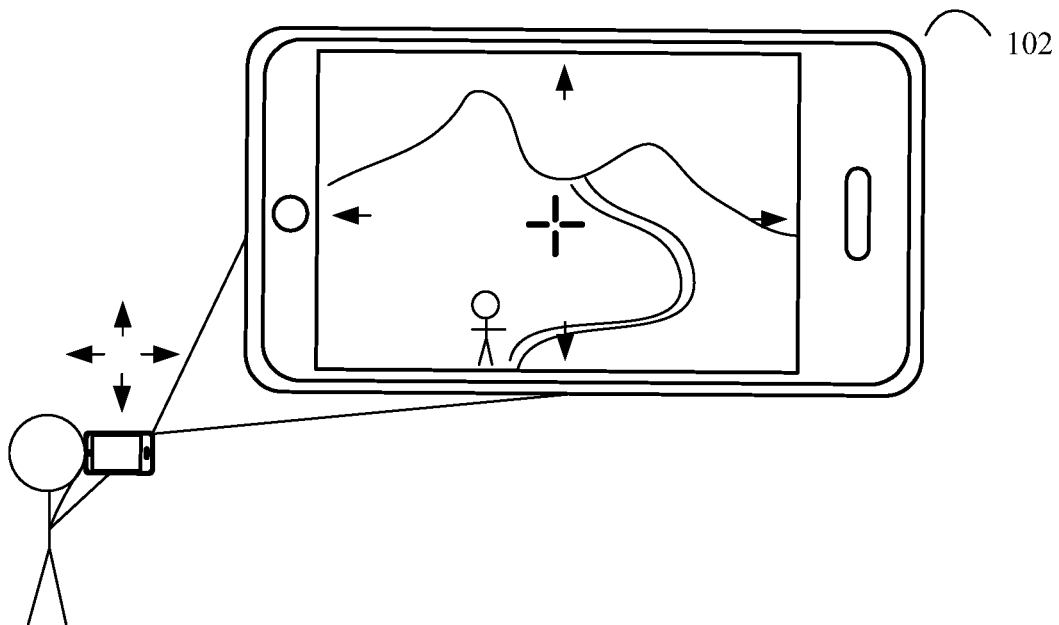

FIG. 1

| A terminal detects, by using a sensor on the terminal, that the terminal moves from a first position to a second position, the terminal displaying a first image in a virtual scenario at a first viewing angle in a case that the terminal is located at the first position, and the first image displaying an object targeting identifier | S202 |

| The terminal determines a second viewing angle according to the first position, the second position, and the first viewing angle, a first variation quantity from the first viewing angle to the second viewing angle corresponding to a second variation quantity from the first position to the second position | S204 |

| The terminal displays a second image in the virtual scenario at the second viewing angle in a case that the terminal is located at the second position, the second image also displaying the object targeting identifier | S206 |

FIG. 2

VIEWING ANGLE ADJUSTMENT METHOD AND DEVICE, STORAGE MEDIUM, AND ELECTRONIC DEVICE

RELATED APPLICATION

This application is a continuation-in-part application of the International PCT Application No. PCT/CN2018/123990, filed with the Chinese Patent Office on Dec. 26, 2018 which claims priority to Chinese Patent Application No. 2018100549394, entitled "VIEWING ANGLE ADJUSTMENT METHOD AND DEVICE, STORAGE MEDIUM, AND ELECTRONIC DEVICE" and filed with the Chinese Patent Office on Jan. 19, 2018, which are incorporated herein by reference in their entireties.

FIELD OF THE TECHNOLOGY

This application relates to the field of computers, and specifically, to a method and device, a storage medium, and an electronic device for performing viewing angle adjustment.

BACKGROUND OF THE DISCLOSURE

Currently, in a related terminal application supported by a mobile terminal, a viewing angle displayed on the mobile terminal is generally adjusted according to a touchscreen position acquired by performing a screen sliding operation on a touchscreen by a user. For example, a screen sliding distance between the touchscreen position and an initial position before the screen sliding operation may be detected, and the mobile terminal may be controlled to adjust a displayed viewing angle according to the screen sliding distance, thereby displaying an image in a virtual scene at the adjusted viewing angle.

During the execution of the terminal application, a preset task in the terminal application needs to be completed by using both hands together. Therefore, when the screen sliding operation is to be performed, a task currently being executed needs to be suspended temporarily to perform the screen sliding operation separately. That is, in the process of adjusting the displayed viewing angle, an additional screen sliding operation needs to be performed separately, which causes a problem of relatively high operation complexity of the viewing angle adjustment.

For the foregoing problem, no effective solution has been provided at present.

SUMMARY

Embodiments of this application provide a method and device, a storage medium, and an electronic device for implementing viewing angle adjustment, to resolve the technical problem of relatively high operation complexity of viewing angle adjustment in a viewing angle adjustment process provided in the related art.

In the embodiments of this application, a terminal comprises a sensor. The sensor may be a spatial location sensor, which is used to detect spatial location change of the terminal. The sensor may also be a gyro, which is used to detect angle or angular change (or orientation, or orientation change) of the terminal. In this application, a position may refer to a spatial position such as a spatial point in the space, or an angle position, which may be represented by an angle vector that can be measured by the gyro. Correspondingly, a position change may be a spatial change from point A to point B, or an angular change, caused by tilting, rotating, flipping, or panning and the like of the terminal. For example, a flip of the terminal along its horizontal or vertical central axis, or a rotation along the center point of the terminal. Furthermore, the spatial location sensor and the gyro may be separately configured, or may be integrated as a single device in the terminal. The position change may also be a combination of spatial and angular change of the terminal. The sensor in the terminal detects that the terminal changes from a first position (spatial or angular) to a second position (spatial or angular), and the position change of the terminal may be caused by a spatial movement, or an angular change of the terminal.

According to an aspect of the embodiments of this application, a viewing angle adjustment method is provided. The method includes: detecting, by a terminal by using a sensor in the terminal, that the terminal changes from a first position to a second position, the terminal displaying a first image in a virtual scene at a first viewing angle when the terminal is located at the first position, and the first image displaying an object targeting identifier; determining, by the terminal, a second viewing angle according to the first position, the second position, and the first viewing angle, a second variation quantity from the first viewing angle to the second viewing angle corresponding to a first variation quantity from the first position to the second position; and displaying, by the terminal, a second image in the virtual scene at the second viewing angle when the terminal is located at the second position, the second image also displaying the object targeting identifier.

According to another aspect of the embodiments of this application, a viewing angle adjustment device applied to a terminal is further provided. The device includes: a detection unit, configured to detect by using a sensor in the terminal, that the terminal changes from a first position to a second position, the terminal displaying a first image in a virtual scene at a first viewing angle when the terminal is located at the first position, and the first image displaying an object targeting identifier; a determining unit, configured to determine a second viewing angle according to the first position, the second position, and the first viewing angle, a second variation quantity from the first viewing angle to the second viewing angle corresponding to a first variation quantity from the first position to the second position; and a display unit, configured to display a second image in the virtual scene at the second viewing angle when the terminal is located at the second position, the second image also displaying the object targeting identifier.

According to still another aspect of the embodiments of this application, a storage medium is further provided. The storage medium includes a stored program, the program performing the foregoing viewing angle adjustment method when being executed.

According to still another aspect of the embodiments of this application, an electronic device is further provided. The electronic device includes a memory, a processor, and a computer program that is stored in the memory and capable of being executed in the processor, the processor performing the foregoing viewing angle adjustment method by using the computer program.

In the embodiments of this application, the sensor in the terminal detects that the terminal changes from a first position to a second position, the terminal displaying the first image in the virtual scene at the first viewing angle when the terminal is located at the first position; the terminal determines the second viewing angle according to the first position, the second position, and the first viewing angle;

and displays the second image in the virtual scene at the second viewing angle. Therefore, the terminal can adjust the image in the virtual scene at the displayed viewing angle according to the position change of the terminal, and there is no need to use both hands to perform the screen sliding operation to control the displayed viewing angle of the terminal, thus achieving an objective of simplifying the viewing angle adjustment operation of the terminal, thereby resolving the technical problem of relatively high operation complexity of viewing angle adjustment in a viewing angle adjustment process provided in the related art.

BRIEF DESCRIPTION OF THE DRAWINGS

The accompanying drawings described herein are used for providing further understanding for this application and constitute a part of this application. Exemplary embodiments of this application and descriptions thereof are used for explaining this application and do not constitute an improper limitation to this application. A person of ordinary skill in the art can derive other accompanying drawings according to these accompanying drawings without creative efforts. In the accompanying drawings:

FIG. 1 is a schematic diagram of an application environment of an optional viewing angle adjustment method according to an embodiment of this application.

FIG. 2 is a schematic flowchart of an optional viewing angle adjustment method according to an embodiment of this application.

DESCRIPTION OF EMBODIMENTS

Figure 3:
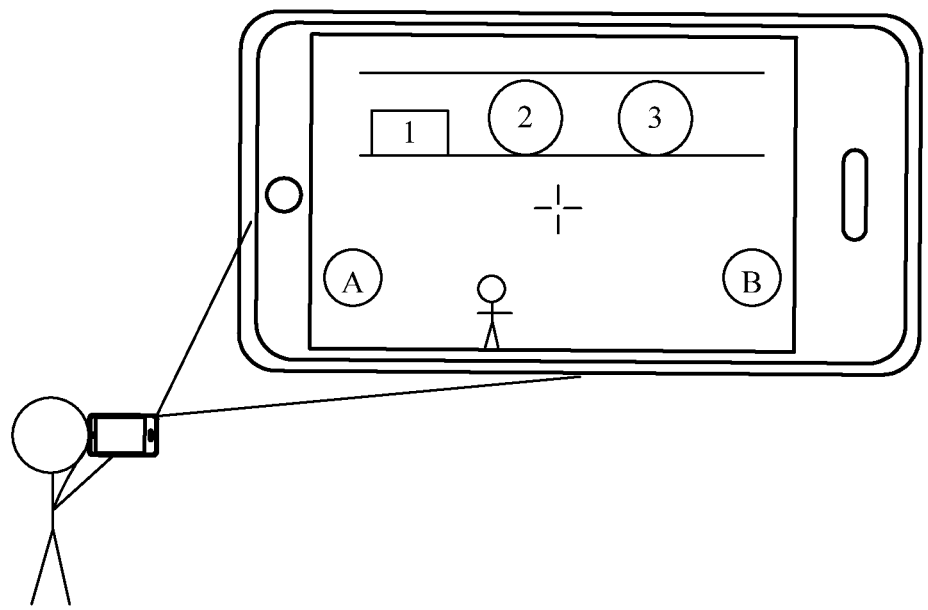
FIG. 3 is a schematic diagram of an optional viewing angle adjustment method according to an embodiment of this application.

To make a person skilled in the art better understand solutions of this application, the following disclosure describes the technical solutions in embodiments of this application with reference to the accompanying drawings in the embodiments of this application. The described embodiments are merely some rather than all of the embodiments of this application. Other embodiments obtained by a person skilled in the art based on the embodiments of this application without creative efforts shall fall within the protection scope of this application.

In the specification, claims, and accompanying drawings of this application, the terms "first", "second", and so on are intended to distinguish between similar objects rather than indicating a specific order. It is understood that the data termed in such a way are interchangeable in proper circumstances, so that the embodiments of this application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

According to an aspect of the embodiments of this application, a viewing angle adjustment method is provided. Optionally, the method may be applied to, but not limited to, an application environment shown in FIG. 1. A terminal 102 detects, by using a sensor in the terminal 102, that the terminal changes from a first position to a second position, the terminal 102 displaying a first image in a virtual scene at a first viewing angle when the terminal 102 is located at the first position, and the first image displaying an object targeting identifier; the terminal 102 determines a second viewing angle according to the first position, the second position, and the first viewing angle; and the terminal 102 displays a second image in the virtual scene at the second viewing angle when the terminal 102 is located at the second position, the second image also displaying the object targeting identifier.

In this application, the term "position" is used to refer to a spatial position such as a spatial point in the space, or an angle position, which may be represented by an angle vector that can be measured by the gyro. Correspondingly, a position change may be a spatial change from point A to point B, or an angular change, caused by tilting, rotating, flipping, or panning and the like of the terminal. For example, a flip of the terminal along its horizontal or vertical central axis, or a rotation along the center point of the terminal. Accordingly, the sensor may be a spatial location sensor, which is used to detect spatial location change of the terminal. The sensor may also be a gyro, which is used to detect angle or angular change (or orientation, or orientation change) of the terminal. In some implementations, a spatial location sensor and a gyro may be integrated in a single device.

According to the viewing angle adjustment method, after the sensor in the terminal detects a position change of the terminal, the terminal determines a varied second viewing angle according to positions before and after the variation and the first viewing angle before the variation, and displays the second image according to the second viewing angle, thereby achieving an objective of adjusting the viewing angle according to the varied position of the terminal, and further adjusting the displayed images. Meanwhile, there is no need to perform the screen sliding operation to control and adjust the displayed viewing angle of the terminal by using both hands, so that the operation of the viewing angle adjustment of the terminal is simplified, and the technical problem of relatively high operation complexity of viewing angle adjustment in a viewing angle adjustment process provided in the related art is resolved.

Optionally, in this embodiment, as an optional implementation, as shown in FIG. 2, the viewing angle adjustment method may include:

S202: A terminal detects, by using a sensor in the terminal, that the terminal changes from a first position to a second position, the terminal displaying a first image in a virtual scene at a first viewing angle when the terminal is located at the first position, and the first image displaying an object targeting identifier;

S204: The terminal determines a second viewing angle according to the first position, the second position, and the first viewing angle, a second variation quantity from the first viewing angle to the second viewing angle corresponding to a first variation quantity from the first position to the second position; and S206: The terminal displays a second image in the virtual scene at the second viewing angle when the terminal is located at the second position, the second image also displaying the object targeting identifier.

Optionally, in this embodiment, the viewing angle adjustment method may be applied to, but not limited to, an application scenario in a mobile terminal that is used for determining a controlled target object. For example, the application scenario may be applied to, but not limited to, a game application for determining a target object during a game process interaction; and a shopping application for determining a target object selected in a shopping process. For example, when the viewing angle adjustment method is applied to the game application, a game viewing angle in the game application may be adjusted by adjusting a position change of the terminal. Therefore, an image displayed in a game scenario is changed through a variation of the game viewing angle, so as to determine the target object of the game interaction; or, when being applied to the shopping application, the method may adjust an image displayed at a shopping viewing angle by adjusting the position change of the terminal, so as to determine the target object to be purchased. For example, as shown in FIG. 3, a plurality of products are shown in a virtual shopping scenario. FIG. 3 shows a product 1, a product 2, and a product 3. Assuming that the terminal currently displays the first image at the first viewing angle, when it is detected that the terminal change from the first position to the second position, the second viewing angle may be determined through the first position, the second position, and the first viewing angle, and a second image of the virtual shopping scenario may be displayed according to the second viewing angle, thereby achieving an objective of directly adjusting an image in a viewing angle displayed in the terminal by controlling the position change of the terminal, to simplify the viewing angle adjustment operation.

Optionally, in this embodiment, the position change of the terminal detected by the sensor in the terminal may be a variation of a horizontal spatial position, a variation of a vertical spatial position, or a combination of variation of the horizontal position and the vertical position. The position change may also be an angular position change caused by rotating, flipping, tilting, or panning of the terminal. The position change may further be a combination of spatial and angular change of the terminal.

Optionally, in this embodiment, after the terminal displays the second image in the virtual scene at the second viewing angle when the terminal is at the second position (spatial or angular), the method further includes: acquiring, by the terminal, an operation instruction for performing an operation on a targeted object in the virtual scene when a display position of the object targeting identifier in the second image coincides with a display position of the targeted object.

Figure 4:
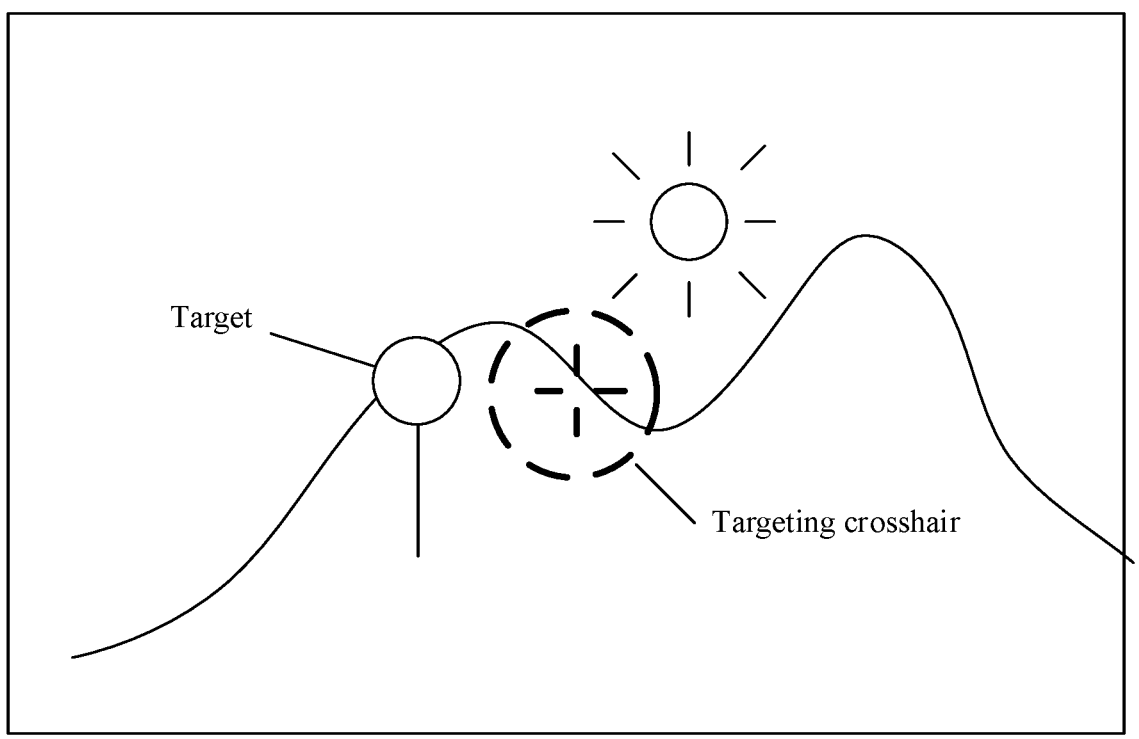
FIG. 4 is a schematic diagram of another optional viewing angle adjustment method according to an embodiment of this application.

Using a shooting game application as an example, the object targeting identifier may be a targeting crosshair, the targeted object may be a target, and the operation instruction may be a shooting instruction. FIG. 4 shows the targeted object (the target shown in a solid circle) and the object targeting identifier (the targeting crosshair corresponding to a cross line segment in a dotted circle). When the sensor in the terminal detects the position change of the terminal, the viewing angle displayed in the terminal may vary correspondingly. With reference to FIG. 4, in an image in the virtual scene displayed at the varied viewing angle, a relative position of the targeting crosshair located at a fixed position at the viewing angle and the target may vary correspondingly. When the varied targeting crosshair coincides with the target, the shooting instruction is acquired, to complete a shooting operation on the target.

Figure 5:
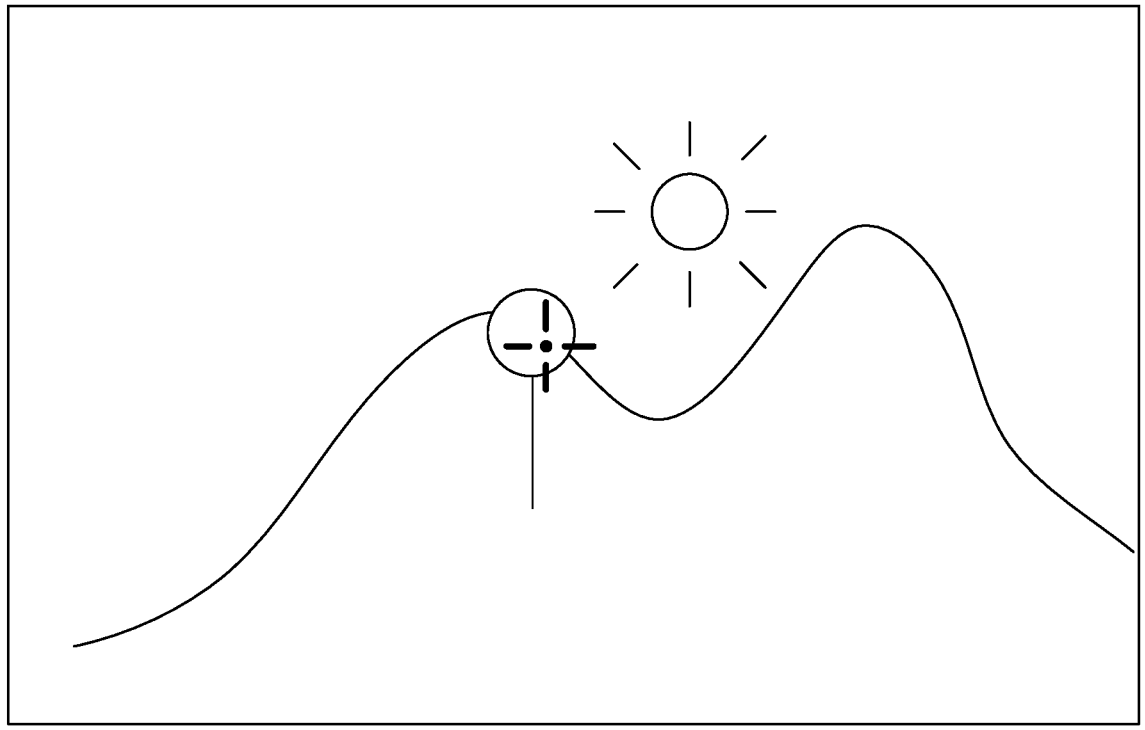
FIG. 5 is a schematic diagram of still another optional viewing angle adjustment method according to an embodiment of this application.

Optionally, in this embodiment, after the terminal displays the second image in the virtual scene at the second viewing angle when the terminal is located at the second position, the method further includes: changing, by the terminal, a style of the targeting identifier when a display position of the object targeting identifier in the second image coincides with a display position of the targeted object in the virtual scene. For example, as shown in FIG. 4, a targeting identifier is composed of four line segments and a targeted object, and the targeting identifier does not coincide with a target object. As shown in FIG. 5, the targeting identifier and the targeted object coincide. Therefore, the terminal changes the style of the targeting identifier, and the targeting identifier composed of four line segments is changed into a targeting identifier composed of four line segments and an origin.

Optionally, in this embodiment, the terminal changing the style of the targeting identifier may be, but is not limited to, a change of color, shape, or size of the targeting identifier, which is not specifically limited in this embodiment.

Optionally, before the sensor in the terminal detects that the terminal changes from the first position to the second position, the method further includes: receiving, by the terminal, a locking instruction, the locking instruction being used for locking a viewing angle displayed by the terminal at a current position. For example, the terminal locks the viewing angle displayed by the terminal at the current position when receiving the locking instruction. In this case, after the position of the terminal changes, the viewing angle displayed by the terminal at the current position is not modified. Using the viewing angle adjustment method being applied to the game field as an example, when a user plays games by using a handheld terminal, a current pose of the user or position of the terminal needs to be changed because of the impact of a long game time or tiredness or other reasons. However, the user does not want the position change of the current terminal to affect the viewing angle in the game application. Therefore, when the terminal receives the locking instruction, it indicates that the user is inducing a position change of the terminal that is irrelevant to the game application. In this case, the sensor in the terminal does not detect the position change of the terminal. When receiving a subsequent instruction of canceling the locking, the sensor in the terminal continues to detect the position change of the terminal when the locking instruction is canceled.

Optionally, in this embodiment, that the terminal determines a second viewing angle according to the first position, the second position, and the first viewing angle may include: acquiring, by the terminal, a first variation quantity from the first position to the second position; acquiring, by the terminal, a second variation quantity according to the first variation quantity; and controlling, by the terminal, the first viewing angle to be changed to the second viewing angle according to the second variation quantity.

In this embodiment, the first variation quantity may include, but not limited to, a variation direction, a variation angle, a variation speed, a variation angular speed, and a variation distance of the position of the terminal.

When the first variation quantity includes the variation in spatial direction, the process of determining, by the terminal, a second viewing angle according to the first position, the second position, and the first viewing angle may further include: determining, by the terminal, a change of direction of the second viewing angle relative to the first viewing angle according to a change of direction of the second position relative to the first position.

Figure 6:
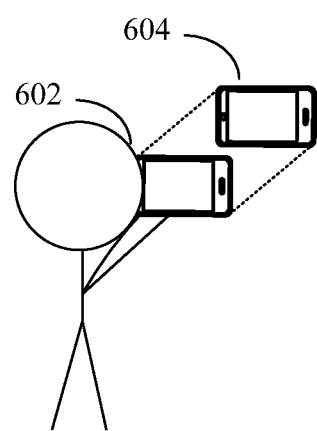
FIG. 6 is a schematic diagram of still another optional viewing angle adjustment method according to an embodiment of this application.
Figure 7:
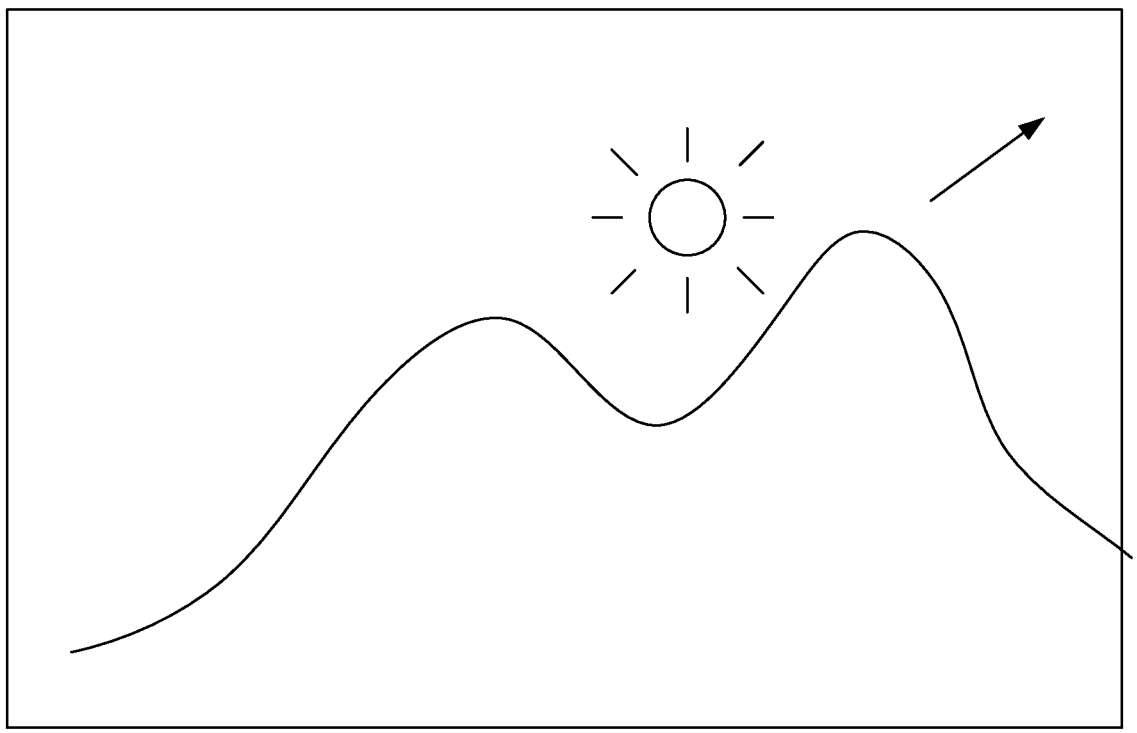
FIG. 7 is a schematic diagram of still another optional viewing angle adjustment method according to an embodiment of this application.
Figure 8:
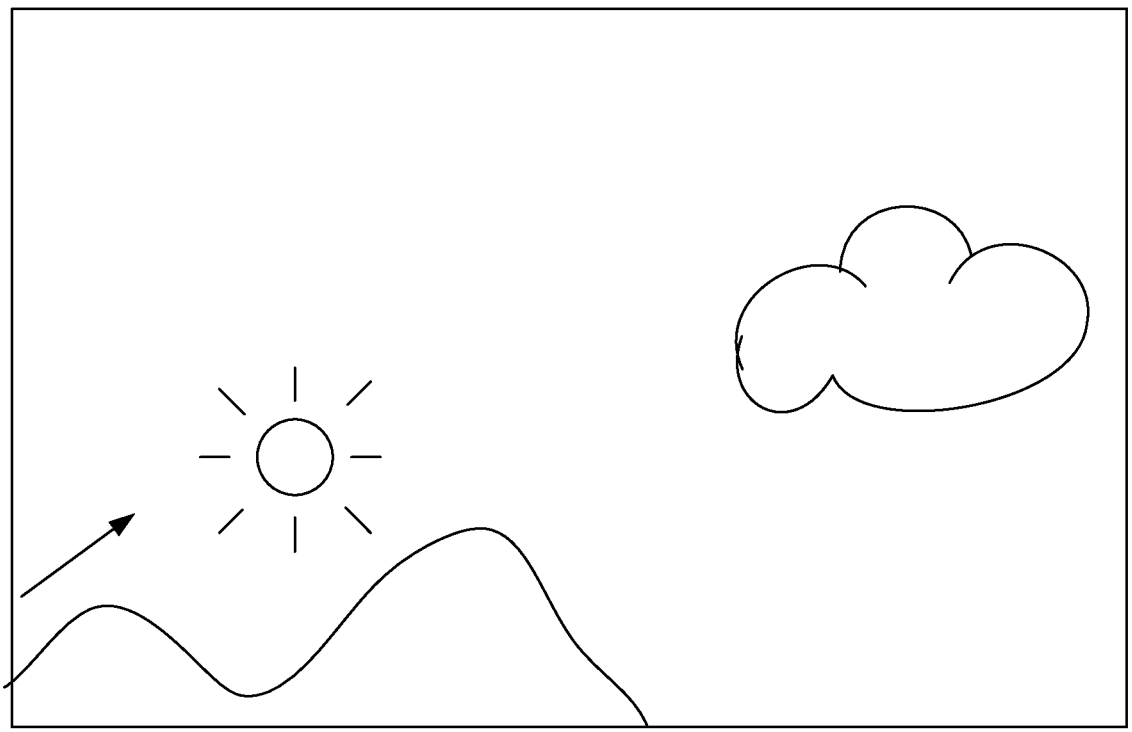
FIG. 8 is a schematic diagram of still another optional viewing angle adjustment method according to an embodiment of this application.

For example, as shown in FIG. 6, a position 602 is the first position of the terminal, and a position 604 is the second position of the terminal. Assuming that the terminal changes from the position 602 to the position 604, the position 604 being located at an upper right direction relative to the position 602. FIG. 7 shows a first image at a first viewing angle displayed at the position 602 by the terminal, and FIG. 8 shows a second image at a second viewing angle displayed at the position 604 by the terminal. That is, after the terminal moves to the upper right direction, the viewing angle displayed by the terminal is adjusted from the first viewing angle to the second viewing angle, and correspondingly, an image displayed in a virtual scene is adjusted from the first image shown in FIG. 7 to the second image shown in FIG. 8.

In addition, when the first variation quantity includes the variation speed (spatial speed or angular speed), the process of determining, by the terminal, a second viewing angle according to the first position, the second position, and the first viewing angle may further include: determining, by the terminal, a variation speed from the first viewing angle to the second viewing angle according to a variation speed of the terminal from the first position to the second position.

For example, when the sensor in the terminal detects that the terminal changes from the first position to the second position, the terminal acquires the variation speed of the terminal from the first position to the second position, and controls the first viewing angle of the terminal to be changed to the second viewing angle according to the acquired variation speed. A fast variation speed of the terminal from the first position to the second position indicates a fast speed of the terminal from the first viewing angle to the second viewing angle; and a slow variation speed of the terminal from the first position to the second position indicates a slow speed of the terminal from the first viewing angle to the second viewing angle.

Through this embodiment of this application, the sensor in the terminal detects that the terminal changes from the first position to the second position, the terminal displaying the first image in the virtual scene at the first viewing angle when the terminal is located at the first position; the terminal determines the second viewing angle according to the first position, the second position, and the first viewing angle; and displays the second image in the virtual scene according to the determined second viewing angle. Therefore, the image in the virtual scene at the displayed viewing angle can be adjusted according to the position change of the terminal, and there is no need to use both hands to perform the screen sliding operation to control the displayed viewing angle of the terminal, thus achieving an objective of simplifying the viewing angle adjustment operation of the terminal, thereby resolving the technical problem of relatively high operation complexity of viewing angle adjustment in a viewing angle adjustment process provided in the related art.

As an optional implementation, after the terminal displays the second image in the virtual scene at the second viewing angle when the terminal is located at the second position, the method further includes:

S1: The terminal acquires an operation instruction for performing an operation on a targeted object in the virtual scene when a display position of the object targeting identifier in the second image coincides with a display position of the targeted object.

Optionally, the operation instruction may be, but not limited to, an interaction operation with the targeted object, including: moving the targeted object, attacking the targeted object, viewing an attribute of the targeted object, changing a state of the targeted object, communicating with the targeted object, entering the targeted object, and the like. This is merely an example, which is not limited in this embodiment.

Optionally, the acquiring an operation instruction for performing an operation on a targeted object may include, but not limited to, acquiring the operation instruction using a voice input method; and acquiring the operation instruction using a screen touch method.

Figure 9:
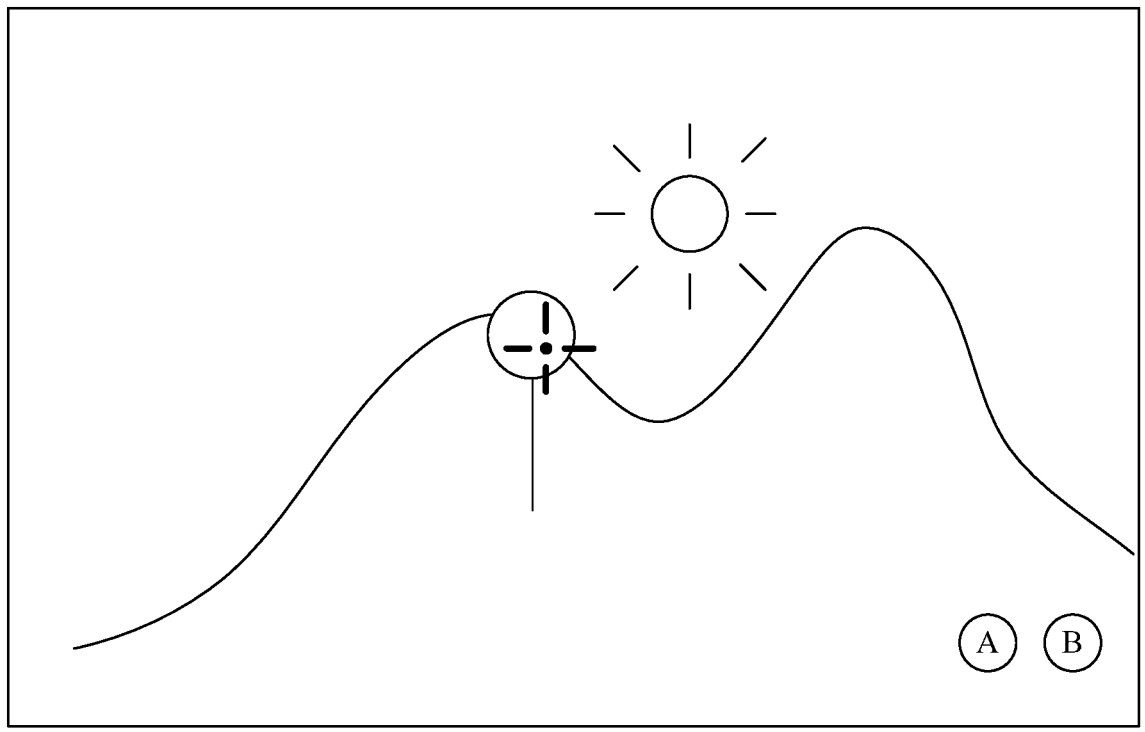
FIG. 9 is a schematic diagram of still another optional viewing angle adjustment method according to an embodiment of this application.

Using a shooting game application as an example, the targeted object may be a target, and the targeting identifier may be a targeting crosshair. When the targeting crosshair coincides with the targeted object in the game screen, an attack operation may be performed on the target by pressing a button A or a button B at the right side of the game screen, as shown in FIG. 9; or when the targeting crosshair coincides with the targeted object in the game screen, an attack operation may be performed on the target by acquiring voice input information. For example, if the voice input information is "attack", the attack operation may be performed according to the voice input information.

In this embodiment, the manner of performing the attack operation through the button or the manner of performing the attack operation by acquiring the voice input information both are optional examples of the attack operation, and this embodiment does not specifically limit the manner of performing the attack operation.

In the game application, the targeted object may be an enemy object, or a teammate object. When the targeting identifier coincides with the teammate object, an interaction with the teammate may be performed by pressing the button A or the button B at the right side, for example, instant communications information may be exchanged. In addition, in the shopping application, the targeted object may further be a virtual product, and the targeting identifier may be a select box. When the select box coincides with the virtual product, the virtual product may be selected or purchased by pressing the button A or the button B at the right side.

In this embodiment, the targeted object may be any object that needs to be interacted in the virtual scene. The foregoing is merely an optional example, and this embodiment does not specifically limit the targeted object.

Through this embodiment of this application, when the display position of the object targeting identifier in the second image coincides with the display position of the targeted object in the virtual scene, the terminal acquires the operation instruction for performing an operation on the targeted object. Therefore, the operation may be performed on the targeted object according to the acquired operation instruction, and operation steps of the operation performed on the targeted object in the viewing angle adjustment process is simplified without manual and repeated adjustment, therefore achieving the effect of improving operation efficiency of the operation performed on the targeted object in the viewing angle adjustment process.

As an optional implementation, the process of detecting, by a terminal by using a sensor in the terminal, that the terminal changes from a first position to a second position further includes:

S1: The terminal acquires a control instruction generated by performing a control operation on a control region on the terminal, the control instruction being used for controlling a target object in the virtual scene to perform an action.

S2: The terminal controls, in response to the control instruction, the target object to perform at least one of the following actions: controlling the target object to perform a movement action, and controlling the target object to perform an action on a displayed targeted object.

Using a racing game application as an example, the target object may be a game character object, and the control instruction may be a movement instruction. After a movement instruction of "running forward" is acquired through the touch screen, in response to the movement instruction of "running forward", the terminal may control the game character object to run forward.

Optionally, the target object may be any object controlled in the terminal application, for example, a virtual character or a virtual item. The control instruction may be, but not limited to be used for controlling the target object to move, attack, select, switch equipment, rescue, pick up, discard, or the like. For example, if the target object is a virtual character, and the control instruction is "moving forward", the virtual character is controlled to move forward. The virtual character may be a person, an animal, or the like, which is not limited specifically herein.

Through this embodiment of this application, in the process of detecting, by using the sensor in the terminal, that the terminal changes from a first position to a second position, the terminal acquires the control instruction generated by performing the control operation on the control region on the terminal; and the terminal controls, in response to the control instruction, the target object to perform the action. Therefore, an objective of controlling the target object to perform various actions in the viewing angle adjustment process is achieved, steps of controlling the target object to perform the action in the viewing angle adjustment process is simplified, and the control efficiency of the target object is improved.

As an optional implementation, the terminal determines a second viewing angle according to the first position, the second position, and the first viewing angle includes:

S1: The terminal acquires a first variation quantity from the first position to the second position.

S2: The terminal acquires a second variation quantity according to the first variation quantity.

S3: The terminal controls the first viewing angle to be changed to the second viewing angle according to the second variation quantity.

Optionally, the first variation quantity includes, but not limited to, a variation direction, a variation angle, a variation speed, a variation angular speed, a variation distance, and the like.

Figure 10:
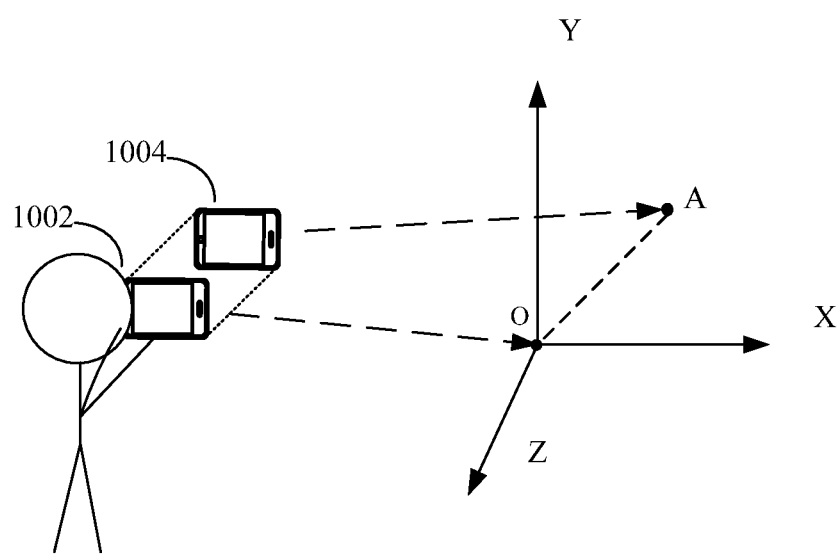
FIG. 10 is a schematic diagram of still another optional viewing angle adjustment method according to an embodiment of this application.

For example, as shown in FIG. 10, a three-dimensional coordinate system is established with an initial position of the terminal as an origin, where a plane at which a terminal plane is located is an X-axis and a Y-axis of the three-dimensional coordinate system, and a direction perpendicular to the terminal plane and facing the outside of the screen is a Z-axis of the three-dimensional coordinate system. After the terminal changes from a first position 1002 to a second position 1004, correspondingly, the position changes from an origin O to a point A in the three-dimensional coordinate system. The terminal acquires the variation direction, the variation speed, and the variation distance of the terminal variation, acquires a variation direction, a variation speed, and a variation distance from the first viewing angle to the second viewing angle according to the acquired variation direction, variation speed, and variation distance, and controls, according to the variation direction, the variation speed, and the variation distance from the first viewing angle to the second viewing angle, the terminal to be changed from the first viewing angle to the second viewing angle.

Through this embodiment of this application, the terminal acquires the second variation quantity according to the first variation quantity of the terminal from the first position to the second position, and controls, according to the second variation quantity, the terminal to be changed from the first viewing angle to the second viewing angle. Therefore, an objective of adjusting an image in the virtual scene at the displayed viewing angle according to the position change of the terminal is achieved.

As an optional implementation, the acquiring the second variation quantity according to the first variation quantity of the terminal includes:

S1: The terminal acquires a viewing angle adjustment sensitivity.

S2: The terminal acquires the second variation quantity according to the first variation quantity and the viewing angle adjustment sensitivity.

In addition to receiving a sensitivity, the terminal may optionally set the viewing angle adjustment sensitivity according to the received sensitivity. Optionally, the sensitivity may be inputted by a user or automatically generated by a system, which is not limited in this embodiment.

For example, assuming that the received sensitivity is a vector a, the first variation quantity may be a vector b, and the second variation quantity may be acquired by multiplying the vector a by the vector b.

Optionally, the acquiring manner of acquiring the second variation quantity by multiplying the first variation quantity by the sensitivity is merely an example, and the specific calculation method is not limited in this embodiment herein.

Through this embodiment of this application, the terminal acquires the viewing angle adjustment sensitivity and determines the second variation quantity according to the viewing angle adjustment sensitivity and the first variation quantity. Therefore, the viewing angle is adjusted according to the viewing angle adjustment sensitivity in the viewing angle adjustment process, thereby improving a degree of freedom of the viewing angle adjustment, and achieving an objective of flexibly adjusting the viewing angle of the terminal.

As an optional implementation, that the terminal acquires a viewing angle adjustment sensitivity includes:

S1: The terminal detects a press instruction generated by performing a press operation on a region on the terminal.

S2: The terminal determines the viewing angle adjustment sensitivity as a first sensitivity when the press instruction is detected.

S3: The terminal determines the viewing angle adjustment sensitivity as a second sensitivity when the press instruction is not detected.

The first sensitivity is less than the second sensitivity.

Optionally, the region on which the press operation is performed may be a non-control region. The non-control region may be, but is not limited to, a region indicated out of the control button.

Figure 11:
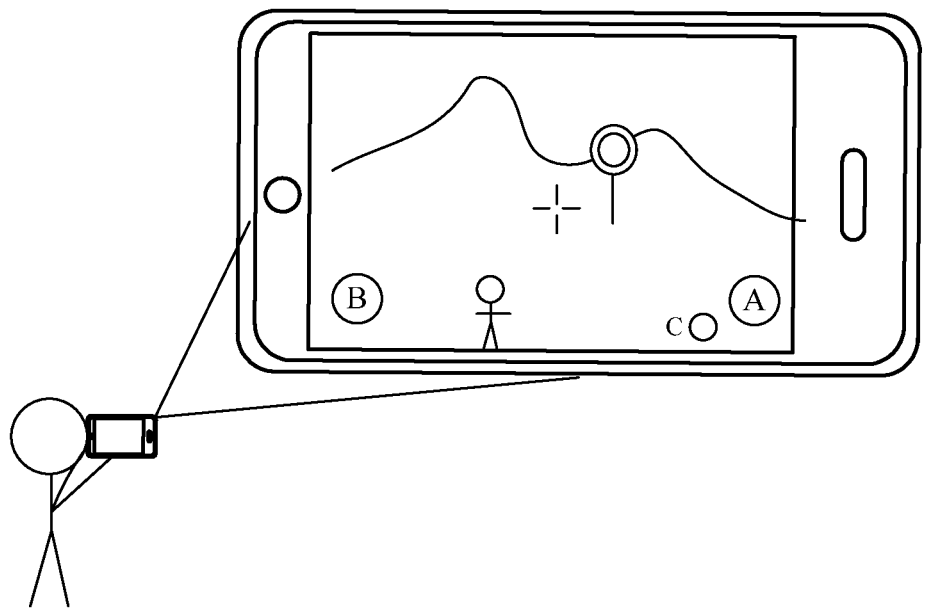
FIG. 11 is a schematic diagram of still another optional viewing angle adjustment method according to an embodiment of this application.

Using the game application as an example, FIG. 11 shows an optional game scenario. The object targeting identifier is located at a center position of the screen. The button A shown in FIG. 11 is a control region. A character in the game is controlled to shoot when the control region is detected to be pressed. When a press instruction on a region out of the button A on the terminal is detected, the terminal sets the viewing angle adjustment sensitivity as the first sensitivity; and when the press instruction on the region out of the button A on the terminal is not detected, the terminal determines the viewing angle adjustment sensitivity as the second sensitivity. The first sensitivity is less than the second sensitivity.

Through this embodiment of this application, the terminal determines whether the press instruction generated by performing the press operation on the region on the terminal is detected, to determine the viewing angle adjustment sensitivity, and determines the second variation quantity according to the viewing angle adjustment sensitivity. Therefore, the viewing angle is adjusted according to different adjustment sensitivities in the viewing angle adjustment process, thereby increasing the adjustment manner of adjusting the viewing angle, and improving the accuracy of adjusting the viewing angle.

As an optional implementation, the terminal acquires a viewing angle adjustment sensitivity includes:

S1: The terminal acquires a display mode of the terminal.

S2: The terminal determines the viewing angle adjustment sensitivity as a third sensitivity when the display mode is a panorama mode.

S3: The terminal determines the viewing angle adjustment sensitivity as a fourth sensitivity when the display mode is a local mode.

The third sensitivity is different from the fourth sensitivity.

Figure 12:
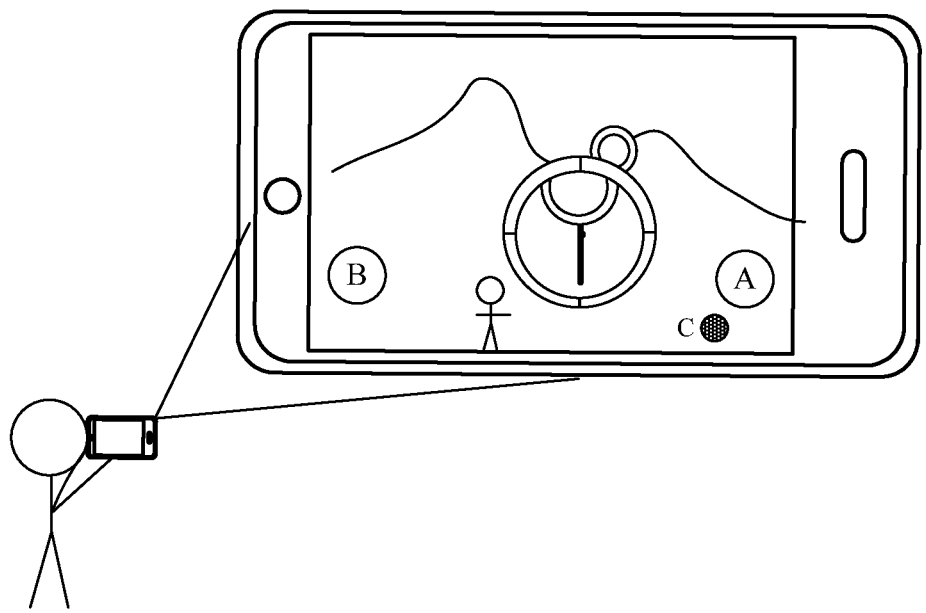
FIG. 12 is a schematic diagram of still another optional viewing angle adjustment method according to an embodiment of this application.

Using a shooting game application as an example, FIG. 12 shows an optional shooting game scenario. As shown in FIG. 12, a button B at the left side is used for controlling the game character to move, and the button A at the right side is used for controlling the game character to attack. A button C under the button A at the right side is used for switching the display mode of the terminal. After the button C is pressed, the display mode of the terminal is switched from the panorama mode to the local mode, and in this case, the color of the button C has changes, which is shown as a shadow in FIG. 12. After the button C is pressed again, the local mode of the terminal is canceled, and is recovered to the object targeting identifier shown in FIG. 11. The color of the button C is recovered to the color of the panorama mode. The local mode of pressing the button C and the panorama mode of canceling the local mode correspond to different viewing angle adjustment sensitivities.

The panorama mode may be, but is not limited to, normal targeting in the shooting game, and the local mode may be, but is not limited to, pre-shooting targeting in the shooting game. In the local mode, a part of the targeted object coincides with the targeting identifier will be zoomed-in for display. This is merely an example, which is not limited in this embodiment.

Through this embodiment of this application, the terminal sets different viewing angle adjustment sensitivities according to the display mode of the terminal, determines the second variation quantity according to the different viewing angle adjustment sensitivities, and further adjusts the viewing angle of the terminal through the second variation quantity. Therefore, the viewing angle is adjusted according to different adjustment sensitivities in the viewing angle adjustment process, thereby increasing the adjustment manner of adjusting the viewing angle, and improving the accuracy of adjusting the viewing angle.

In one implementation, based on the configuration of the sensor of the terminal, there may be different set of viewing angle adjustment sensitivities. For example, if the sensor is configured to be a spatial location sensor, there may be one set of viewing angle adjustment sensitivities, namely first, second, third, and fourth sensitivity. Similarly, if the sensor is configured to be a gyro, there may be another set of viewing angle adjustment sensitivities. These two sets of sensitivities may be different or the same, they may be set or adjusted by the terminal, or may be set or adjusted by the user at any time. Additionally, these two sets of sensitivities may co-exist, when the sensor of the terminal is configured to detect both spatial position (or spatial position change) and angular position (or angular position change).

As an optional implementation, that the terminal controls the first viewing angle to be changed to the second viewing angle according to the second variation quantity includes:

S1: The terminal acquires a product of the first variation quantity and the viewing angle adjustment sensitivity. The second variation quantity may be set to the product of the first variation quantity and the viewing angle adjustment sensitivity.

S2: The terminal controls the first viewing angle to be changed to the second viewing angle according to the second variation quantity when a value of the product is greater than a preset threshold.

For example, when the sensor in the terminal is configure to be a spatial location sensor, a distance variation quantity α in the first variation quantity is acquired, and λ is the viewing angle adjustment sensitivity. The viewing angle adjustment sensitivity may be chosen from the set of viewing angle adjustment sensitivities corresponding to the sensor configuration described above. As shown in FIG. 9, after the terminal acquires the distance variation quantity α in the first variation quantity, the distance variation quantity α in the first variation quantity is projected on the X-axis and the Y-axis. A vector projection acquired by the terminal is OA, and if a product of the OA and λ is greater than the preset threshold, an interface or viewing angle displayed for a client is adjusted according to the method in the foregoing embodiments. The product of the OA and λ may be acquired through the following formula:

$$|\lambda\alpha|=\lambda\sqrt{x^2+y^2}. \tag{1}$$

Figure 15:
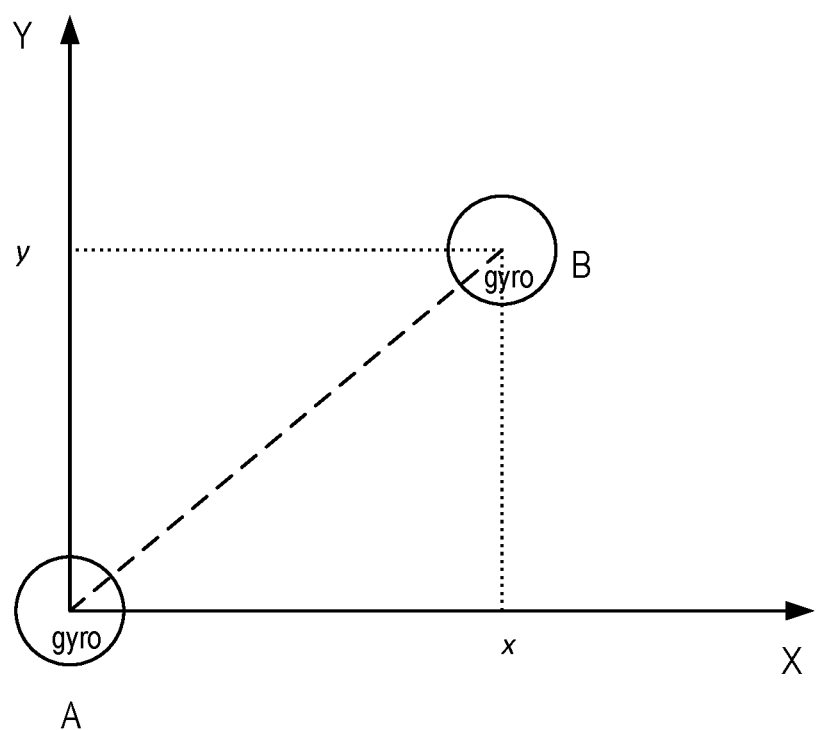
FIG. 15 is a diagram illustrating an angle vector detected by a gyro during an angular position change of the gyro.

For another example, when the sensor in the terminal is configured to be a gyro, the gyro may be used to detect an angle variation quantity α as the first variation quantity. In this case, α is a two dimensional angle variation vector and it is determined by the internal positional change of the gyro in its X-axis and Y-axis. As such, the internal gyro positional change can be directly used to represent the angular variation vector. As shown in FIG. 15, the gyro moves from point A to point B internally in a gyroscope, and α=(x, y). Further assuming λ is the viewing angle adjustment sensitivity. The viewing angle adjustment sensitivity may be chosen from the set of viewing angle adjustment sensitivities corresponding to the sensor configuration described above. If a product of α and λ is greater than the preset threshold, an interface or viewing angle displayed for a client is adjusted according to the method in the foregoing embodiments. The product of α and λ may be acquired through the formula (1) listed above.

In one implementation, the threshold values may be different or the same between each set of viewing angle adjustment sensitivities (spatial sensitivity set and angular sensitivity set) and within each set of sensitivities. For example, one threshold value to be used with the first viewing angle adjustment sensitivity, when the sensor is configured to a gyro, and another threshold may be used with the second viewing angle adjustment sensitivity, when the sensor is configured to be a spatial location sensor. The threshold values may further be set or adjusted by the terminal and/or the user at any time.

Through this embodiment of this application, by checking if a product of a terminal movement vector and a movement sensitivity is greater than the preset threshold, to determine whether the position change of the terminal is a position change caused by an unintentional tiny jitter. Therefore, the impact of the unintentional tiny jitter of the terminal on the viewing angle of the terminal is avoided, and the adjustment accuracy of the viewing angle of the terminal is improved.

For simple descriptions, the foregoing method embodiments are stated as a series of action combinations. However, a person skilled in the art is to learn that this application is not limited to the sequence of the described actions, because according to this application, some steps may use another sequence or may be simultaneously performed. Secondarily, a person skilled in the art is to learn that the embodiments described in the specification all belong to optional embodiments and the related actions and modules may not be necessary for this application.

According to the descriptions in the foregoing implementations, a person skilled in the art may clearly learn that the method according to the foregoing embodiments may be implemented by relying on software and a necessary and commonly used hardware platform or by using hardware, but in many cases the former is a better implementation. Based on such an understanding, the technical solutions in this application essentially or the part contributing to the related art may be implemented in the form of a software product. The computer software product is stored in a storage medium (such as a ROM/RAM, a magnetic disk, or an optical disc), and includes several instructions for instructing a terminal device (which may be a mobile phone, a computer, a server, a network device, and the like) to perform the method described in the embodiments of this application.

Figure 13:
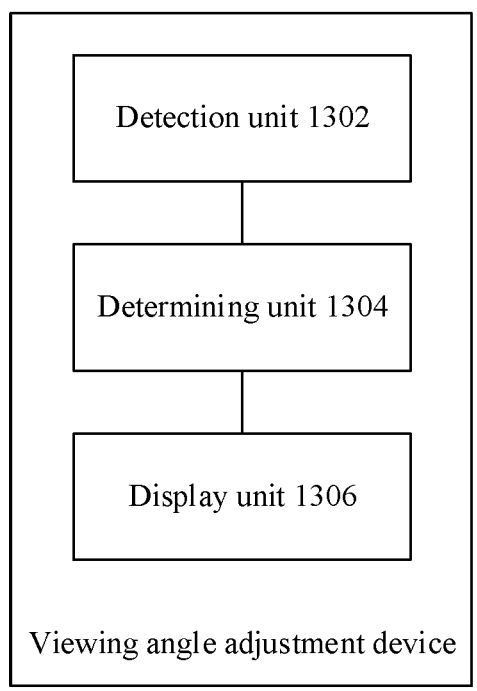
FIG. 13 is a schematic diagram of an optional viewing angle adjustment device according to an embodiment of this application.

According to another aspect of the embodiments of this application, a viewing angle adjustment device for implementing the foregoing viewing angle adjustment method is further provided. The foregoing device may be applied, but not limited to, a terminal. As an optional example, as shown in FIG. 13, the device further includes:

(1) a detection unit 1302, configured to detect, by using a sensor on a terminal, that the terminal changes from a first position to a second position, the terminal displaying a first image in a virtual scene at a first viewing angle when the terminal is located at the first position, and the first image displaying an object targeting identifier, wherein the sensor may be configured to be a spatial location sensor or a gyro;

(2) a determining unit 1304, configured to determine a second viewing angle according to the first position, the second position, and the first viewing angle, a second variation quantity from the first viewing angle to the second viewing angle corresponding to a first variation quantity from the first position to the second position; and (3) a display unit 1306, configured to display a second image in the virtual scene at the second viewing angle when the terminal is located at the second position, the second image also displaying the object targeting identifier.

Optionally, in this embodiment, the viewing angle adjustment method may be applied to, but is not limited to, an application scenario in a mobile terminal that is used for determining a controlled target object. For example, the application scenario may be applied to, but is not limited to, a game application for determining a target object of a game process interaction; and a shopping application for determining a target object selected in a shipping process. For example, when the viewing angle adjustment method is applied to the game application, a game viewing angle in the game application may be adjusted by adjusting a position change of the terminal. Therefore, an image displayed in a game scenario is changed through a variation of the game viewing angle, so as to determine the target object of the game interaction; or, when being applied to the shopping application, the method may adjust an image displayed at a shopping viewing angle by adjusting the position change of the terminal, so as to determine the target object to be purchased. For example, as shown in FIG. 3, a plurality of products are shown in a virtual shopping scenario. FIG. 3 shows a product 1, a product 2, and a product 3. Assuming that the terminal currently displays the first image at the first viewing angle, when it is detected that the terminal changes from the first position to the second position, the second viewing angle may be determined through the first position, the second position, and the first viewing angle, and a second image of the virtual shopping scenario may be displayed according to the second viewing angle, thereby achieving an objective of directly adjusting an image in a viewing angle displayed in the terminal by controlling the position change of the terminal, to simplify the viewing angle adjustment operation.

Optionally, in this embodiment, the position change of the terminal detected by the sensor may be a variation of a horizontal spatial position, a variation of a vertical spatial position, or a combination of variation of the horizontal position and the vertical position. The position change may also be an angular change caused by rotating, flipping, tilting, or panning of the terminal. The position change may further be a combination of spatial and angular change of the terminal.

Optionally, in this embodiment, after the terminal displays the second image in the virtual scene at the second viewing angle when the terminal is located at the second position, the method further includes: acquiring an operation instruction for performing an operation on a targeted object in the virtual scene when a display position of the object targeting identifier in the second image coincides with a display position of the targeted object.

Using a shooting game application as an example, the object targeting identifier may be a targeting crosshair, the targeted object may be a target, and the operation instruction may be a shooting instruction. FIG. 4 shows the targeted object (the target shown in a solid circle) and the object targeting identifier (the targeting crosshair corresponding to a cross line segment in a dotted circle). When the sensor detects the position change of the terminal, the viewing angle displayed in the terminal may vary correspondingly. With reference to FIG. 4, in an image in the virtual scene displayed at the varied viewing angle, a relative position of the targeting crosshair located at a fixed position at the viewing angle and the target may vary correspondingly. When the varied targeting crosshair coincides with the target, a shooting instruction is acquired, to complete a shooting operation on the target.

Optionally, in this embodiment, after the terminal displays the second image in the virtual scene at the second viewing angle when the terminal is located at the second position, the method further includes: changing, a style of the targeting identifier when a display position of the object targeting identifier in the second image coincides with a display position of the targeted object in the virtual scene. For example, as shown in FIG. 4, a targeting identifier is composed of four line segments and a targeted object, and the targeting identifier does not coincide with a target object. As shown in FIG. 5, the targeting identifier and the targeted object coincide. Therefore, the style of the targeting identifier is changed, and the targeting identifier composed of four line segments is changed into a targeting identifier composed of four line segments and an origin.

Optionally, in this embodiment, the changing the style of the targeting identifier may be, but is not limited to, a change of color, shape, or size of the targeting identifier, which is not specifically limited in this embodiment.

Optionally, before the sensor in the terminal detects that the terminal changes from the first position to the second position, the method further includes: receiving a locking instruction, the locking instruction being used for locking a viewing angle displayed by the terminal at a current position. For example, the viewing angle displayed by the terminal at the current position is locked when the locking instruction is received. In this case, after the position of the terminal is changed, the viewing angle displayed by the terminal at the current position is not changed. Using the viewing angle adjustment method being applied to the game field as an example, when a user plays games by using a handheld terminal, a current pose of the user or position of the terminal needs to be changed because of the impact of a long game time or tiredness or other reasons. However, the user does not want the position change of the current terminal to affect the viewing angle in the game application. Therefore, when the terminal receives the locking instruction, it indicates that the user is inducing a position change of the terminal that is irrelevant to the game application. In this case, the sensor in the terminal does not detect the position change of the terminal. When receiving a subsequent instruction of canceling the locking, the sensor in the terminal continues to detect the position change of the terminal when the locking instruction is canceled.

Optionally, in this embodiment, the determining a second viewing angle according to the first position, the second position, and the first viewing angle may include: acquiring a first variation quantity from the first position to the second position; acquiring a second variation quantity according to the first variation quantity; and controlling the first viewing angle to be changed to the second viewing angle according to the second variation quantity.

In this embodiment, the first variation quantity may include, but not limited to, a variation direction, a variation angle, a variation speed, a variation angular speed, and a variation distance of the position of the terminal.

When the first variation quantity including the variation direction, the process of determining a second viewing angle according to the first position, the second position, and the first viewing angle may further include: determining a movement direction of the second viewing angle relative to the first viewing angle according to a movement direction of the second position relative to the first position.

For example, as shown in FIG. 6, a position 602 is the first position of the terminal, and a position 604 is the second position of the terminal. Assuming that the terminal changes from the position 602 to the position 604, the position 604 being located at an upper right direction relative to the position 602. FIG. 7 shows a first image at a first viewing angle displayed at the position 602 by the terminal, and FIG. 8 shows a second image at a second viewing angle displayed at the position 604 by the terminal. That is, after the terminal moves to the upper right direction, the viewing angle displayed by the terminal is adjusted from the first viewing angle to the second viewing angle, and correspondingly, an image displayed in a virtual scene is adjusted from the first image shown in FIG. 7 to the second image shown in FIG. 8.

In addition, when the first variation quantity includes the variation speed, a process of the determining a second viewing angle according to the first position, the second position, and the first viewing angle may further include: determining a variation speed or a variation angular speed from the first viewing angle to the second viewing angle according to a variation speed of the terminal from the first position to the second position.

For example, when the sensor in the terminal detects that the terminal changes from the first position to the second position, the variation speed (spatial speed of angular speed) of the terminal from the first position to the second position is acquired, and the first viewing angle of the terminal is controlled to be varied to the second viewing angle according to the acquired variation speed. A fast variation speed of the terminal from the first position to the second position indicates a fast speed of the terminal from the first viewing angle to the second viewing angle; and a slow variation speed of the terminal from the first position to the second position indicates a slow speed of the terminal from the first viewing angle to the second viewing angle.

Through this embodiment of this application, the sensor in the terminal detects that the terminal changes from the first position to the second position, the terminal displaying the first image in the virtual scene at the first viewing angle when the terminal is located at the first position; the terminal determines the second viewing angle according to the first position, the second position, and the first viewing angle; and displays the second image in the virtual scene according to the determined second viewing angle. Therefore, the image in the virtual scene at the displayed viewing angle can be adjusted according to the position change of the terminal, and there is no need to use both hands to perform the screen sliding operation to control the displayed viewing angle of the terminal, so thus achieving an objective of simplifying the viewing angle adjustment operation of the terminal, thereby resolving the technical problem of relatively high operation complexity of viewing angle adjustment in a viewing angle adjustment process provided in the related art.

As an optional solution, the device further includes:

(1) an acquisition unit, configured to: after the second image in the virtual scene is displayed at the second viewing angle when the terminal is located at the second position, acquire an operation instruction for performing an operation on a targeted object in the virtual scene when a display position of the object targeting identifier in the second image coincides with a display position of the targeted object.

Optionally, the operation instruction may be, but not limited to, an interaction operation with the targeted object, including: moving the targeted object, attacking the targeted object, viewing an attribute of the targeted object, changing a state of the targeted object, communicating with the targeted object, entering the targeted object, and the like. This is merely an example, which is not limited in this embodiment.

Optionally, the acquiring an operation instruction for performing an operation on a targeted object may include, but not limited to, acquiring the operation instruction using a voice input method; and acquiring the operation instruction using a screen touch method.

Using a shooting game application as an example, the targeted object may be a target, and the targeting identifier may be a targeting crosshair. When the targeting crosshair coincides with the targeted object in the game screen, an attack operation may be performed on the target by pressing a button A or a button B at the right side of the game screen, as shown in FIG. 9; or when the targeting crosshair coincides with the targeted object in the game screen, an attack operation may be performed on the target by acquiring voice input information. For example, if the voice input information is "attack", the attack operation may be performed according to the voice input information.

In this embodiment, the manner of performing the attack operation through the button or the manner of performing the attack operation by acquiring the voice input information both are optional examples of the attack operation, and this embodiment does not specifically limit the manner of performing the attack operation.

In the game application, the targeted object may be an enemy object, or a teammate object. When the targeting identifier coincides with the teammate object, an interaction with the teammate may be performed by pressing the button A or the button B at the right side, for example, instant communications information may be exchanged. In addition, in the shopping application, the targeted object may further be a virtual product, and the targeting identifier may be a select box. When the select box coincides with the virtual product, the virtual product may be selected or purchased by pressing the button A or the button B at the right side.

In this embodiment, the targeted object may be any object that needs to be interacted in the virtual scene. The foregoing is merely an optional example, and this embodiment does not specifically limit the targeted object.

Through this embodiment of this application, when the display position of the object targeting identifier in the second image coincides with the display position of the targeted object in the virtual scene, the operation instruction for performing an operation on the targeted object is acquired. Therefore, the operation may be performed on the targeted object according to the acquired operation instruction, and operation steps of the operation performed on the targeted object in the viewing angle adjustment process is simplified without manual and repeated adjustment, therefore achieving the effect of improving operation efficiency of the operation performed on the targeted object in the viewing angle adjustment process.

As an optional solution, the detection unit 1302 includes:

(1) a first acquisition module, configured to acquire a control instruction generated by performing a control operation on a control region on the terminal, the control instruction being used for controlling a target object in the virtual scene to perform an action; and (2) a first control module, configured to control, in response to the control instruction, the target object to perform at least one of the following actions: controlling the target object to perform a movement action, and controlling the target object to perform an action on a displayed targeted object.

Using a racing game application as an example, the target object may be a game character object, and the control instruction may be a movement instruction. After a movement instruction of "running forward" is acquired through the touch screen, in response to the movement instruction of "running forward", the game character object may be controlled to run forward.

Optionally, the target object may be any object controlled in the terminal application, for example, a virtual character or a virtual item. The control instruction may be, but not limited to be used for controlling the target object to move, attack, select, switch equipment, rescue, pick up, discard, or the like. For example, if the target object is a virtual character, and the control instruction is "moving forward", the virtual character is controlled to move forward. The virtual character may be a person, an animal, or the like, which is not limited specifically herein.

Through this embodiment of this application, in the process of detecting, by using the sensor in the terminal, that the terminal changes from a first position to a second position, the control instruction generated by performing the control operation on the control region on the terminal is acquired; and the target object is controlled, in response to the control instruction, to perform the action. Therefore, an objective of controlling the target object to perform various actions in the viewing angle adjustment process is achieved, steps of controlling the target object to perform the action in the viewing angle adjustment process is simplified, and the control efficiency of the target object is improved.

As an optional solution, the determining unit 1304 includes:

(1) a second acquisition module, configured to acquire a first variation quantity from the first position to the second position;

(2) a third acquisition module, configured to acquire a second variation quantity according to the first variation quantity; and (3) a second control module, configured to control the first viewing angle to be changed to the second viewing angle according to the second variation quantity.

Optionally, the first variation quantity includes, but not limited to, a variation direction, a variation angle, a variation speed, a variation angular speed, a variation distance, and the like.

For example, as shown in FIG. 10, a three-dimensional coordinate system is established with an initial position of the terminal as an origin, where a plane at which a terminal plane is located is an X-axis and a Y-axis of the three-dimensional coordinate system, and a direction perpendicular to the terminal plane and facing the outside of the screen is a Z-axis of the three-dimensional coordinate system. After the terminal changes from a first position 1002 to a second position 1004, correspondingly, the position changes from an origin O to a point A in the three-dimensional coordinate system. The terminal acquires the variation direction, the variation speed, and the variation distance of the terminal variation, acquires a variation direction, a variation speed, and a variation distance from the first viewing angle to the second viewing angle according to the acquired variation direction, variation speed, and variation distance, and controls, according to the variation direction, the variation speed, and the variation distance from the first viewing angle to the second viewing angle, the terminal to be changed from the first viewing angle to the second viewing angle.

Through this embodiment of this application, the second variation quantity is acquired according to the first variation quantity of the terminal from the first position to the second position, and the terminal is controlled to be changed from the first viewing angle to the second viewing angle according to the second variation quantity. Therefore, an objective of adjusting an image in the virtual scene at the displayed viewing angle according to the position change of the terminal is achieved.

As an optional solution, the third acquisition module includes:
(1) a first acquisition submodule, configured to acquire a viewing angle adjustment sensitivity; and
(2) a first determining submodule, configured to acquire the second variation quantity according to the first variation quantity and the viewing angle adjustment sensitivity.

In addition to receiving a sensitivity, the viewing angle adjustment sensitivity may be set according to the received sensitivity. Optionally, the sensitivity may be inputted by a user or automatically generated by a system, which is not limited in this embodiment.

For example, assuming that the received sensitivity is a vector a, the first variation quantity may be a vector b, and the second variation quantity may be acquired by multiplying the vector a by the vector b.

Optionally, the acquiring manner of acquiring the second variation quantity by multiplying the first variation quantity by the sensitivity is merely an example, and the specific calculation method is not limited in this embodiment herein.

Through this embodiment of this application, the viewing angle adjustment sensitivity is acquired and the second variation quantity is determined according to the viewing angle adjustment sensitivity and the first variation quantity. Therefore, the viewing angle is adjusted according to the viewing angle adjustment sensitivity in the viewing angle adjustment process, thereby improving a degree of freedom of the viewing angle adjustment, and achieving an objective of flexibly adjusting the viewing angle of the terminal.

As an optional solution, the first acquisition submodule acquires the viewing angle adjustment sensitivity by using the following steps:
S1: Detect a press instruction generated by performing a press operation on a region on the terminal.
S2: Determine the viewing angle adjustment sensitivity as a first sensitivity when the press instruction is detected.
S3: Determine the viewing angle adjustment sensitivity as a second sensitivity when the press instruction is not detected.

The first sensitivity is less than the second sensitivity.

Optionally, the region on which the press operation is performed may be a non-control region. The non-control region may be, but is not limited to, a region indicated out of the control button.

Using the game application as an example, FIG. 11 shows an optional game scenario. The object targeting identifier is located at a center position of the screen. The button A shown in FIG. 11 is a control region. A character in the game is controlled to shoot when the control region is detected to be pressed. When a press instruction on a region out of the button A on the terminal is detected, the viewing angle adjustment sensitivity is set as the first sensitivity; and when the press instruction on the region out of the button A on the terminal is not detected, the viewing angle adjustment sensitivity is determined as the second sensitivity. The first sensitivity is less than the second sensitivity.

Through this embodiment of this application, whether the press instruction generated by performing the press operation on the region on the terminal is detected is determined, to determine the viewing angle adjustment sensitivity, and the second variation quantity is determined according to the viewing angle adjustment sensitivity. Therefore, the viewing angle is adjusted according to different adjustment sensitivities in the viewing angle adjustment process, thereby increasing the adjustment manner of adjusting the viewing angle, and improving the accuracy of adjusting the viewing angle.

As an optional solution, the first acquisition submodule acquires the viewing angle adjustment sensitivity by using the following steps:
S1: Acquire a display mode of the terminal.
S2: Determine the viewing angle adjustment sensitivity as a third sensitivity when the display mode is a panorama mode.
S3: Determine the viewing angle adjustment sensitivity as a fourth sensitivity when the display mode is a local mode. The third sensitivity is different from the fourth sensitivity.

Using a shooting game application as an example, FIG. 12 shows an optional shooting game scenario. As shown in FIG. 12, a button B at the left side is used for controlling the game character to move, and the button A at the right side is used for controlling the game character to attack. A button C under the button A at the right side is used for switching the display mode of the terminal. After the button C is pressed, the display mode of the terminal is switched from the panorama mode to the local mode, and in this case, the color of the button C has changes, which is shown as a shadow in FIG. 12. After the button C is pressed again, the local mode of the terminal is canceled, and is recovered to the object targeting identifier shown in FIG. 11. The color of the button C is recovered to the color of the panorama mode. The local mode of pressing the button C and the panorama mode of canceling the local mode correspond to different viewing angle adjustment sensitivities.

The panorama mode may be, but is not limited to, normal targeting in the shooting game, and the local mode may be, but is not limited to, pre-shooting targeting in the shooting game. In the local mode, a part of the targeted object coincides with the targeting identifier will be zoomed-in for display. This is merely an example, which is not limited in this embodiment.

Through this embodiment of this application, different viewing angle adjustment sensitivities are set according to the display mode of the terminal, the second variation quantity is determined according to the different viewing angle adjustment sensitivities, and the viewing angle of the terminal is further adjusted through the second variation quantity. Therefore, the viewing angle is adjusted according to different adjustment sensitivities in the viewing angle adjustment process thereby increasing the adjustment manner of adjusting the viewing angle, and improving the accuracy of adjusting the viewing angle.

In one implementation, based on the configuration of the sensor of the terminal, there may be different set of viewing angle adjustment sensitivities. For example, if the sensor is configured to be a spatial location sensor, there may be one set of viewing angle adjustment sensitivities, namely first, second, third, and fourth sensitivity. Similarly, if the sensor is configured to be a gyro, there may be another set of viewing angle adjustment sensitivities. These two sets of sensitivities may be different or the same, they may be set or adjusted by the terminal, or may be set or adjusted by the user at any time. Additionally, these two sets of sensitivities may co-exist, when the sensor of the terminal is configured to detect both spatial position (or spatial position change) and angular position (or angular position change).

As an optional solution, the second control module includes:

(1) a third acquisition submodule, configured to acquire a product of the first variation quantity and the viewing angle adjustment sensitivity; and
(2) a control submodule, configured to control the first viewing angle to be changed to the second viewing angle according to the second variation quantity when a value of the product is greater than a preset threshold.

For example, when the sensor in the terminal is configure to be a spatial location sensor, a distance variation quantity $\alpha$ in the first variation quantity is acquired, and $\lambda$ is the viewing angle adjustment sensitivity. The viewing angle adjustment sensitivity may be chosen from the set of viewing angle adjustment sensitivities corresponding to the sensor configuration described above. As shown in FIG. 9, after the distance variation quantity $\alpha$ in the first variation quantity is acquired, the distance variation quantity $\alpha$ in the first variation quantity is projected on the X-axis and the Y-axis. A vector projection acquired by the terminal is OA, and if a product of the OA and is greater than the preset threshold, an interface or viewing angle displayed for a client is adjusted according to the method in the foregoing embodiments. The product of the OA and $\lambda$ may be acquired through the following formula:

$$|\lambda\alpha = \lambda\sqrt{x^2+y^2}| \quad (2)$$

For another example, when the sensor in the terminal is configured to be a gyro, the gyro may be used to detect an angle variation quantity $\alpha$ as the first variation quantity. In this case, $\alpha$ is a two dimensional angle variation vector and it is determined by the internal positional change of the gyro in its X-axis and Y-axis. As such, the internal gyro positional change can be directly used to represent the angular variation vector. As shown in FIG. 15, the gyro moves from point A to point B internally in a gyroscope, and $\alpha = (x, y)$. Further assuming $\lambda$ is the viewing angle adjustment sensitivity. The viewing angle adjustment sensitivity may be chosen from the set of viewing angle adjustment sensitivities corresponding to the sensor configuration described above. If a product of $\alpha$ and $\lambda$ is greater than the preset threshold, an interface or viewing angle displayed for a client is adjusted according to the method in the foregoing embodiments. The product of $\alpha$ and $\lambda$ may be acquired through the formula (2) listed above.

In one implementation, the threshold values may be different or the same between each set of viewing angle adjustment sensitivities (spatial sensitivity set and angular sensitivity set) and within each set of sensitivities. For example, one threshold value to be used with the first viewing angle adjustment sensitivity, when the sensor is configured to a gyro, and another threshold may be used with the second viewing angle adjustment sensitivity, when the sensor is configured to be a spatial location sensor. The threshold values may further be set or adjusted by the terminal and/or the user at any time.

Through this embodiment of this application, by checking if a product of a terminal movement vector and a movement sensitivity is greater than the preset threshold, to determine whether the position change of the terminal is a position change caused by an unintentional tiny jitter. Therefore, the impact of the tiny unintentional jitter of the terminal on the viewing angle of the terminal is avoided, and the adjustment accuracy of the viewing angle of the terminal is improved.

According to still another aspect of the embodiments of this application, a storage medium is further provided. The storage medium may store executable instructions. The executable instructions are used for performing the viewing angle adjustment method in the foregoing embodiments.

Optionally, in this embodiment, the storage medium is configured to store a computer program configured to perform the following steps:

S1: A terminal detects, by using a sensor in the terminal, that the terminal changes from a first position to a second position, the terminal displaying a first image in a virtual scene at a first viewing angle when the terminal is located at the first position, and the first image displaying an object targeting identifier.

S2: The terminal determines a second viewing angle according to the first position, the second position, and the first viewing angle, a second variation quantity from the first viewing angle to the second viewing angle corresponding to a first variation quantity from the first position to the second position.

S3: The terminal displays a second image in the virtual scene at the second viewing angle when the terminal is located at the second position, the second image also displaying the object targeting identifier.

Optionally, in this embodiment, the storage medium is configured to store a computer program configured to perform the following steps:

S1: The terminal acquires an operation instruction for performing an operation on a targeted object in the virtual scene when a display position of the object targeting identifier in the second image coincides with a display position of the targeted object.

Optionally, in this embodiment, the storage medium is configured to store a computer program configured to perform the following steps:

S1: The terminal acquires a control instruction generated by performing a control operation on a control region on the terminal, the control instruction being used for controlling a target object in the virtual scene to perform an action.

S2: The terminal controls, in response to the control instruction, the target object to perform at least one of the following actions: controlling the target object to perform a movement action, and controlling the target object to perform an action on a displayed targeted object.

Optionally, in this embodiment, the storage medium is configured to store a computer program configured to perform the following steps:

S1: The terminal acquires a first variation quantity from the first position to the second position.

S2: The terminal acquires a second variation quantity according to the first variation quantity.

S3: The terminal controls the first viewing angle to be changed to the second viewing angle according to the second variation quantity.

Optionally, in this embodiment, the storage medium is configured to store a computer program configured to perform the following steps:

S1: The terminal acquires a viewing angle adjustment sensitivity.

S2: The terminal acquires the second variation quantity according to the first variation quantity and the viewing angle adjustment sensitivity.

Optionally, in this embodiment, the storage medium is configured to store a computer program configured to perform the following steps:

S1: The terminal detects a press instruction generated by performing a press operation on a region on the terminal.

S2: The terminal determines the viewing angle adjustment sensitivity as a first sensitivity when the press instruction is detected.

S3: The terminal determines the viewing angle adjustment sensitivity as a second sensitivity when the press instruction is not detected.

Optionally, in this embodiment, the storage medium is configured to store a computer program configured to perform the following steps:

S1: The terminal acquires a display mode of the terminal.

S2: The terminal determines the viewing angle adjustment sensitivity as a third sensitivity when the display mode is a panorama mode.

S3: The terminal determines the viewing angle adjustment sensitivity as a fourth sensitivity when the display mode is a local mode.

Optionally, in this embodiment, the storage medium is configured to store a computer program configured to perform the following steps:

S1: The terminal acquires a product of the first variation quantity and the viewing angle adjustment sensitivity. The second variation quantity may be set to the product of the first variation quantity and the viewing angle adjustment sensitivity.

S2: The terminal controls the first viewing angle to be changed to the second viewing angle according to the second variation quantity when a value of the product is greater than a preset threshold.

Optionally, for a specific example in this embodiment, refer to the examples described in Embodiment 1 and Embodiment 2, and details are not described herein again in this embodiment.

Figure 14:
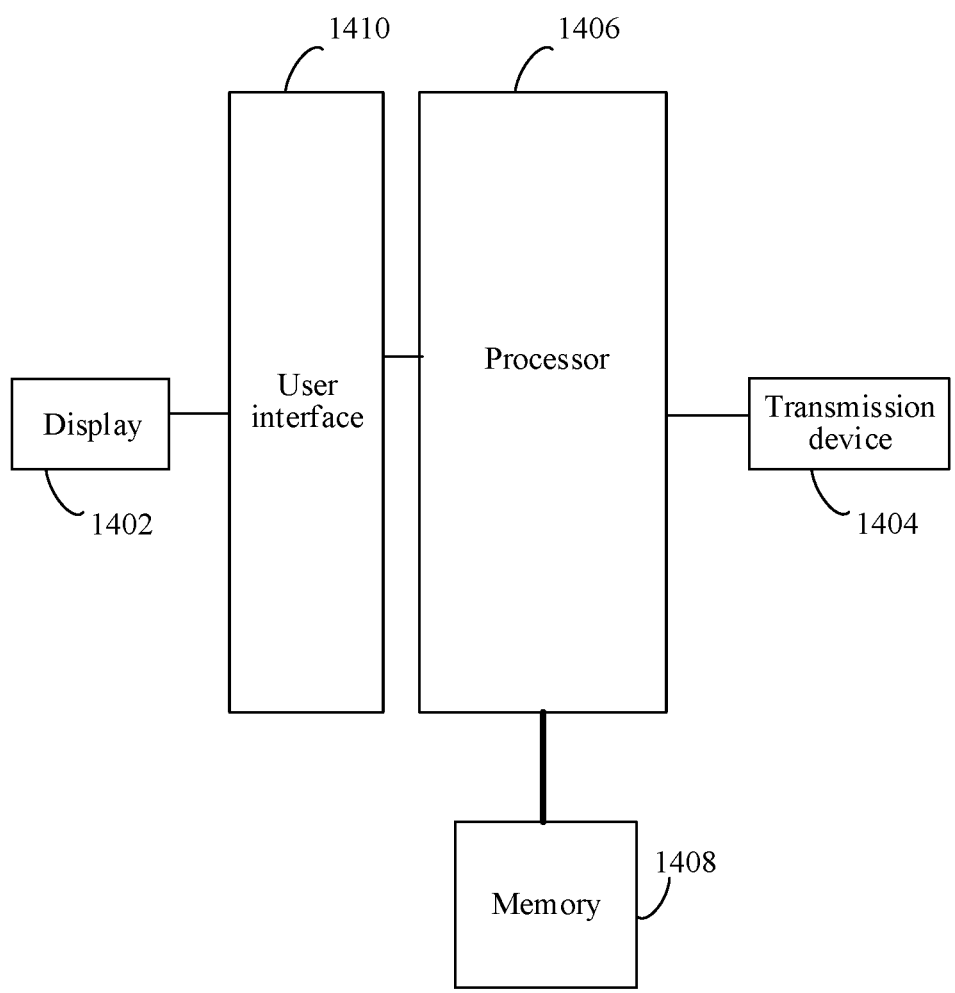
FIG. 14 is a schematic diagram of an optional electronic device according to an embodiment of this application.

According to still another aspect of the embodiments of this application, an electronic device configured to implement the foregoing viewing angle adjustment method is further provided. As shown in FIG. 14, the electronic device includes a memory and a processor, the memory storing a computer program, and the processor being configured to perform steps according to any one of the foregoing method embodiments by using the computer program.

Optionally, in this embodiment, the electronic device may be located in at least one of a plurality of network devices in a computer network.

Optionally, in this embodiment, the processor may be configured to perform the following steps by using the computer program:

S1: A terminal detects, by using a sensor in the terminal, that the terminal changes from a first position to a second position, the terminal displaying a first image in a virtual scene at a first viewing angle when the terminal is located at the first position, and the first image displaying an object targeting identifier;

S2: The terminal determines a second viewing angle according to the first position, the second position, and the first viewing angle, a second variation quantity from the first viewing angle to the second viewing angle corresponding to a first variation quantity from the first position to the second position; and S3: The terminal displays, via display 1402, a second image in the virtual scene at the second viewing angle when the terminal is located at the second position, the second image also displaying the object targeting identifier.

The memory 1408 may be configured to store a software program and a module, for example, a program instruction/module corresponding to the viewing angle adjustment method and device in the embodiments of this application, and the processor 1406 performs various functional applications and data processing by executing the software program and the module stored in the memory 1408, that is, implementing the foregoing viewing angle adjustment method. The memory 1408 may include a high-speed random memory, and may further include a non-volatile memory such as one or more magnetic storage devices, a flash, or another non-volatile solid-state memory. In some examples, the memory 1408 may further include memories remotely disposed relative to the processor 1406, and these remote memories may be connected to a terminal through a network. Instances of the network include, but are not limited to, the Internet, an intranet, a local area network, a mobile communications network, and a combination thereof.

The transmission device 1404 is configured to receive or send data through a network. Specific instances of the foregoing network may include a wired network and a wireless network. In an example, the transmission device 1404 includes a network interface controller (NIC). The NIC may be connected to another network device and a router by using a network cable, so as to communicate with the Internet or the local network. In an example, the transmission device 1404 is a radio frequency (RF) module, which communicates with the Internet in a wireless manner.

The memory 1408 is configured to store position information, image information, and the like. The terminal may also include a user interface 1410.

A person of ordinary skill in the art may understand that, the structure shown in FIG. 14 is only schematic. The electronic device may be a terminal device such as a smartphone (such as an Android mobile phone or an iOS mobile phone), a tablet computer, a palmtop computer, a mobile Internet device (MID), or a PAD. FIG. 14 does not limit the structure of the foregoing electronic device. For example, the electronic device may further include more or less components (such as a network interface, and the like) than those shown in FIG. 14, or have configuration different from that shown in FIG. 14.

In the foregoing embodiments of this application, the descriptions of the embodiments have their respective focuses. For a part that is not described in detail in an embodiment, reference may be made to related descriptions in other embodiments.

In the several embodiments provided in this application, it is understood that the disclosed client may be implemented in other manners. The described device embodiment is merely exemplary. For example, the unit division is merely logical function division and may be other division during actual implementation. For example, a plurality of units or components may be combined or integrated into another system, or some features may be ignored or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separate, and components displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist physically independent, or two or more units are integrated into one unit. The integrated unit may be implemented in the form of hardware, or may be implemented in the form of software functional unit.

The foregoing descriptions are merely optional implementations of this application. It is to be pointed out that a person of ordinary skill in the art may make several improvements or refinements without departing from the principle of this application and the improvements or refinements shall fall within the protection scope of this application.

INDUSTRIAL APPLICABILITY

In the embodiments, the sensor in a terminal may be configured to be a spatial location sensor or a gyro. The sensor detects that the terminal changes from a first position to a second position, the terminal displaying a first image in a virtual scene at a first viewing angle when the terminal is located at the first position; determines a second viewing angle according to the first position, the second position, and the first viewing angle; and displays a second image in the virtual scene at the second viewing angle. Therefore, the image in the virtual scene at the displayed viewing angle is adjusted according to the position change of the terminal, and there is no need to use both hands to perform the screen sliding operation to control the displayed viewing angle of the terminal, thus achieving an objective of simplifying the viewing angle adjustment operation of the terminal.

What is claimed is:

1. A viewing angle adjustment method, applied to a terminal comprising a touchscreen, a memory and a processor in communication with the memory, comprising:
    detecting, by the terminal, by using a sensor in the terminal, that the terminal changes from a first position to a second position, the terminal displaying a first image including a target object in a virtual scene at a first viewing angle when the terminal is at the first position, and the first image displaying an object targeting identifier, wherein the virtual scene displays control buttons on the touchscreen;
    controlling, by the terminal in response to user's touch input on the control buttons when the object targeting identifier in the first image coincides with the targeted object, the target object to perform at least one of controlling the target object to perform a movement action or controlling the target object to perform an action on a displayed targeted object;
    determining, by the terminal, a viewing angle adjustment sensitivity to be a first sensitivity with a first sensitivity value or a second sensitivity with a second sensitivity value based on whether there is a press operation of the user on a a region out of the control buttons on the terminal, in following manner:
        when the press operation is detected, determining the viewing angle adjustment sensitivity to be the first sensitivity; and
        when the press operation is not detected, determining the viewing angle adjustment sensitivity to be the second sensitivity, wherein the first sensitivity is less than the second sensitivity, the first and second sensitives are preset or adjusted by the user;
    determining, by the terminal, a second viewing angle according to the first position, the second position, the viewing angle adjustment sensitivity, and the first viewing angle, a second variation quantity from the first viewing angle to the second viewing angle corresponding to a first variation quantity from the first position to the second position;
    controlling, by the terminal, the first viewing angle to be changed to the second viewing angle according to the second variation quantity;
    displaying, by the terminal, a second image in the virtual scene at the second viewing angle when the terminal is located at the second position, the second image also displaying the object targeting identifier.

2. The method according to claim 1, wherein the first position and the second position are spatial positions measured by the sensor in the terminal configured to be a spatial location sensor, or angular positions measured by the sensor in the terminal configured to be a gyro.

3. The method according to claim 1, wherein after the displaying, by the terminal, a second image in the virtual scene at the second viewing angle when the terminal is located at the second position, the method further comprises:
    acquiring, by the terminal, an operation instruction for performing an operation on the targeted object in the virtual scene when the object targeting identifier in the second image coincides with the targeted object.

4. The method according to claim 1, wherein the sensor in the terminal is configured to be a gyro, and the first variation quantity is an angle variation quantity detected by the gyro.

5. The method according to claim 1, wherein the sensor in the terminal is configured to be a spatial location sensor, and the first variation quantity is a distance variation quantity detected by the spatial location sensor.

6. A terminal for viewing angle adjustment, comprising a touchscreen, a memory for storing computer readable instructions and a processor in communication with the memory, wherein the processor is configured to execute the computer readable instructions to cause the terminal to:
    detect, by using a sensor in the terminal, that the terminal changes from a first position to a second position, the terminal displaying a first image including a target object in a virtual scene at a first viewing angle when the terminal is located at the first position, and the first image displaying an object targeting identifier, wherein the virtual scene displays control buttons on the touchscreen;
    controlling, by the terminal in response to user's touch input on the control buttons when the object targeting identifier in the first image coincides with the targeted object, the target object to perform at least one of controlling the target object to perform a movement action or controlling the target object to perform an action on a displayed targeted object;
    determine a viewing angle adjustment sensitivity to be a first sensitivity with a first sensitivity value or a second sensitivity a second sensitivity value based on whether there is a press operation of the user on a a region out of the control buttons on the terminal, in following manner:

when the press operation is detected, determining the viewing angle adjustment sensitivity to be the first sensitivity; and when the press operation is not detected, determining the viewing angle adjustment sensitivity to be the second sensitivity, wherein the first sensitivity is less than the second sensitivity, the first and second sensitives are preset or adjusted by the user;

determine a second viewing angle according to the first position, the second position, the viewing angle adjustment sensitivity, and the first viewing angle, a second variation quantity from the first viewing angle to the second viewing angle corresponding to a first variation quantity from the first position to the second position;

controlling, by the terminal, the first viewing angle to be changed to the second viewing angle according to the second variation quantity;

display a second image in the virtual scene at the second viewing angle when the terminal is located at the second position, the second image also displaying the object targeting identifier.

7. The terminal according to claim 6, wherein the first position and the second position are spatial positions measured by the sensor in the terminal configured to be a spatial location sensor, or angular positions measured by the sensor in the terminal configured to be a gyro.

8. The terminal according to claim 6, wherein the processor, when executing the computer readable instructions, is further configured to cause the terminal to:

after the second image in the virtual scene is displayed at the second viewing angle when the terminal is located at the second position, acquire an operation instruction for performing an operation on the targeted object in the virtual scene when the object targeting identifier in the second image coincides with the targeted object.

9. The terminal according to claim 4, wherein the sensor in the terminal is configured to be a gyro, and the first variation quantity is an angle variation quantity detected by the gyro.

10. The terminal according to claim 4, wherein the sensor in the terminal is configured to be a spatial location sensor, and the first variation quantity is a distance variation quantity detected by the spatial location sensor.

11. A non-transitory storage medium for storing computer readable instructions, the computer readable instructions, when executed by one or more processors, causing the one or more processors to:

detect a terminal changing from a first position to a second position by using a sensor in the terminal, the terminal displaying, on a touchscreen of the terminal, a first image including a target object in a virtual scene at a first viewing angle when the terminal is located at the first position, wherein the first image displaying an object targeting identifier, wherein the virtual scene displays control buttons on the touchscreen;

controlling, by the terminal in response to user's touch input on the control buttons when the object targeting identifier in the first image coincides with the targeted object, the target object to perform at least one of controlling the target object to perform a movement action or controlling the target object to perform an action on a displayed targeted object;

determine a viewing angle adjustment sensitivity to be a first sensitivity with a first sensitivity value or a second sensitivity a second sensitivity value based on whether there is a press operation of the user on a region out of the control buttons on the terminal, in following manner:

when the press operation is detected, determining the viewing angle adjustment sensitivity to be the first sensitivity; and when the press operation is not detected, determining the viewing angle adjustment sensitivity to be the second sensitivity, wherein the first sensitivity is less than the second sensitivity, the first and second sensitives are preset or adjusted by the user;

determine, a second viewing angle according to the first position, the second position, the viewing angle adjustment sensitivity, and the first viewing angle, a second variation quantity from the first viewing angle to the second viewing angle corresponding to a first variation quantity from the first position to the second position;

controlling, by the terminal, the first viewing angle to be changed to the second viewing angle according to the second variation quantity;

display, on the terminal, a second image in the virtual scene at the second viewing angle when the terminal is located at the second position, wherein the second image also displaying the object targeting identifier.

* * * * *